(12) United States Patent
Rubio et al.

(10) Patent No.: US 8,704,492 B2
(45) Date of Patent: Apr. 22, 2014

(54) AUTOMATIC POWER SWITCHING IN GAME PERIPHERAL

(75) Inventors: Vasco Rubio, Edmonds, WA (US); Kurt Torben Nielsen, Fall City, WA (US); Edward C. Giaimo, III, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 993 days.

(21) Appl. No.: 11/708,724

(22) Filed: Feb. 20, 2007

(65) Prior Publication Data

US 2008/0197716 A1    Aug. 21, 2008

(51) Int. Cl.
    *H02J 7/00*    (2006.01)
(52) U.S. Cl.
    USPC .......................... 320/136; 320/127
(58) Field of Classification Search
    USPC .................. 320/135, 136, 137, 127
    See application file for complete search history.

(56) References Cited

U.S. PATENT DOCUMENTS

| | | | | |
|---|---|---|---|---|
| 4,782,468 A | | 11/1988 | Jones et al. | 365/229 |
| 4,948,138 A | | 8/1990 | Pease et al. | 273/121 |
| 5,315,533 A | | 5/1994 | Stich et al. | 364/480 |
| 5,537,599 A | | 7/1996 | Tanaka | 395/750 |
| 6,470,290 B1 | * | 10/2002 | Lee et al. | 702/132 |
| 6,602,627 B2 | * | 8/2003 | Liu et al. | 429/23 |
| 6,850,229 B2 | | 2/2005 | Casebolt et al. | 245/173 |
| 7,339,353 B1 | * | 3/2008 | Masias et al. | 320/138 |
| 7,753,788 B2 | * | 7/2010 | Lum et al. | 463/39 |
| 2002/0105229 A1 | * | 8/2002 | Tanaka et al. | 307/29 |
| 2004/0077400 A1 | | 4/2004 | Marshall | 463/19 |
| 2005/0227763 A1 | | 10/2005 | Lum et al. | 463/37 |
| 2006/0025217 A1 | * | 2/2006 | Hussaini et al. | 463/36 |
| 2006/0136154 A1 | | 6/2006 | Bliley et al. | 702/58 |
| 2006/0267547 A1 | * | 11/2006 | Godovich | 320/107 |
| 2008/0138028 A1 | * | 6/2008 | Grady et al. | 386/1 |

FOREIGN PATENT DOCUMENTS

EP    1 710 662 A1    10/2006

OTHER PUBLICATIONS

Sands, E. et al., "Video Game Power Limiter", ECE 445, Senior Design Project, 2005, 28 pages, http://courses.ece.uiuc.edu.
Suwalski, P., "Automotive Computing with Game Console Hardware", Apr. 2005, Department of Systems and Computer Engineering, Carleton University, 53 pages.

\* cited by examiner

*Primary Examiner* — Edward Tso
*Assistant Examiner* — Aaron Piggush
(74) *Attorney, Agent, or Firm* — Micah Goldsmith; Micky Minhas (57) ABSTRACT

An input device, such as game peripheral, for a computing device, such as a game console, may have some components that may be powered by AC power only, and some components that may be powered by either AC power or battery power. The switch from AC power to battery power, or vice versa, can be made on-the-fly, in realtime, without disrupting the underlying software application that is being run on the computing device.

20 Claims, 6 Drawing Sheets

AUTOMATIC POWER SWITCHING IN GAME PERIPHERAL

BACKGROUND

With the tremendous commercial success of computer gaming systems, an entire game peripheral market has emerged, including advanced video controllers, joysticks, steering wheel devices for racing games, multi-tap controllers, vibrating controllers, video stands, audio systems and the like. A number of these game peripherals have been developed to provide force feedback or other high-powered features or feedback in response to a signal from a host computer, e.g., during simulations or game play executed on the host computer.

Certain operating features and components of a game peripheral, such as the high-powered motors used to implement force feedback, require AC power to operate. When AC power is not present, these high-powered operating features and components cannot be used. Other features, such as game controller buttons, thumbsticks, triggers, rumble motors, the controller IC, and radio circuitry have low power consumption and can operate from batteries. Switching from AC power to battery power, or vice versa, during game play can interrupt or slow down the game play.

SUMMARY

An input device such as a game peripheral is adapted to couple to a host device, and may receive power from an AC source or a battery. The input device has components that are AC powered, and other components that may run off of AC power or battery power. The source of power is detected. If the received power is from the AC source, then the AC powered components and the other components are operational, and if the received power is from the battery, then the AC powered components are disabled and the other components are powered from the battery. The power source may switch from the AC source to the battery, or vice versa, in realtime.

The operating features of the components that may run off of AC power or battery power may be altered depending on whether the received power is from the AC source or from the battery. Additionally, the power status, comprised within a messaging protocol containing information about the AC power status, an adapter connection status, and status of the first AC powered components, may be transmitted to the host device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

An input device (e.g., a game peripheral) for a computing device (e.g., a game console) may have some components that may be powered by AC power only, and some components that may be powered by either AC power or battery power. The switch from AC power to battery power, or vice versa, can be made on-the-fly, in realtime, without disrupting the underlying software application (e.g., the game) that is being run on the computing device.

Figure 1:
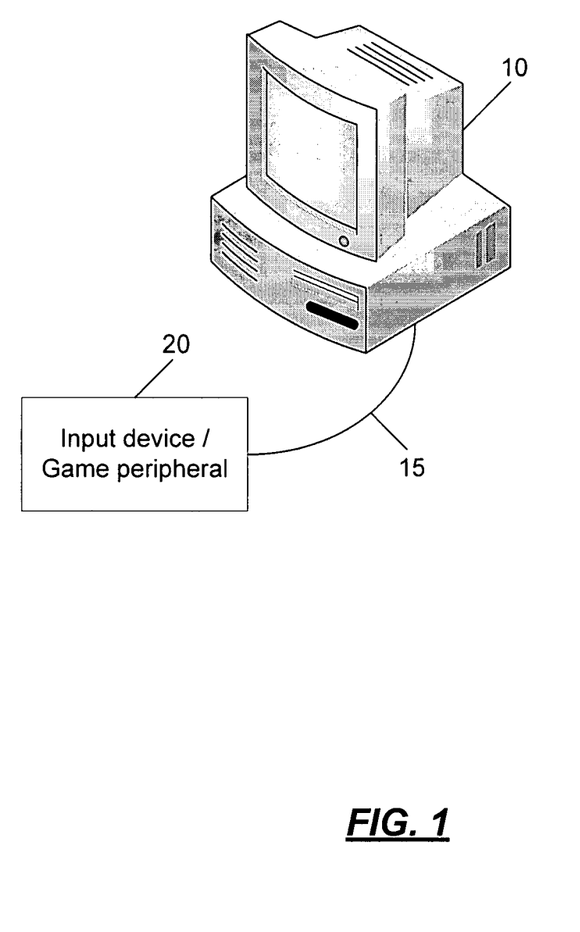
FIG. 1 is a high level diagram of an example environment which may use an input device such as a game peripheral.

As shown in FIG. 1, an input device, such as a game peripheral 20 that provides force feedback (FFB) and/or other high-powered (e.g., AC-powered) features, is connected over a connection 15 to a computer game executing on a personal computer, a video game console, or other host computing device 10. For example, it is contemplated that the game peripheral 20 may be used with Microsoft Corporation's XBOX™ video game console. The connection 15 may be wired or wireless.

Preferably, the game peripheral 20 enables a user to provide input signals to the computer game, and is adapted to enable a user to perceive a sensation as a result of the FF and/or other features that are generated in response to signals received from the host computing device 10 over the connection 15. Although the embodiments described herein refer to a FFB steering wheel as an example input device, any input device that has high-powered components is contemplated, including all FFB and haptic user input devices. The contemplated protocol and architecture is not limited to wheels.

Figure 2:
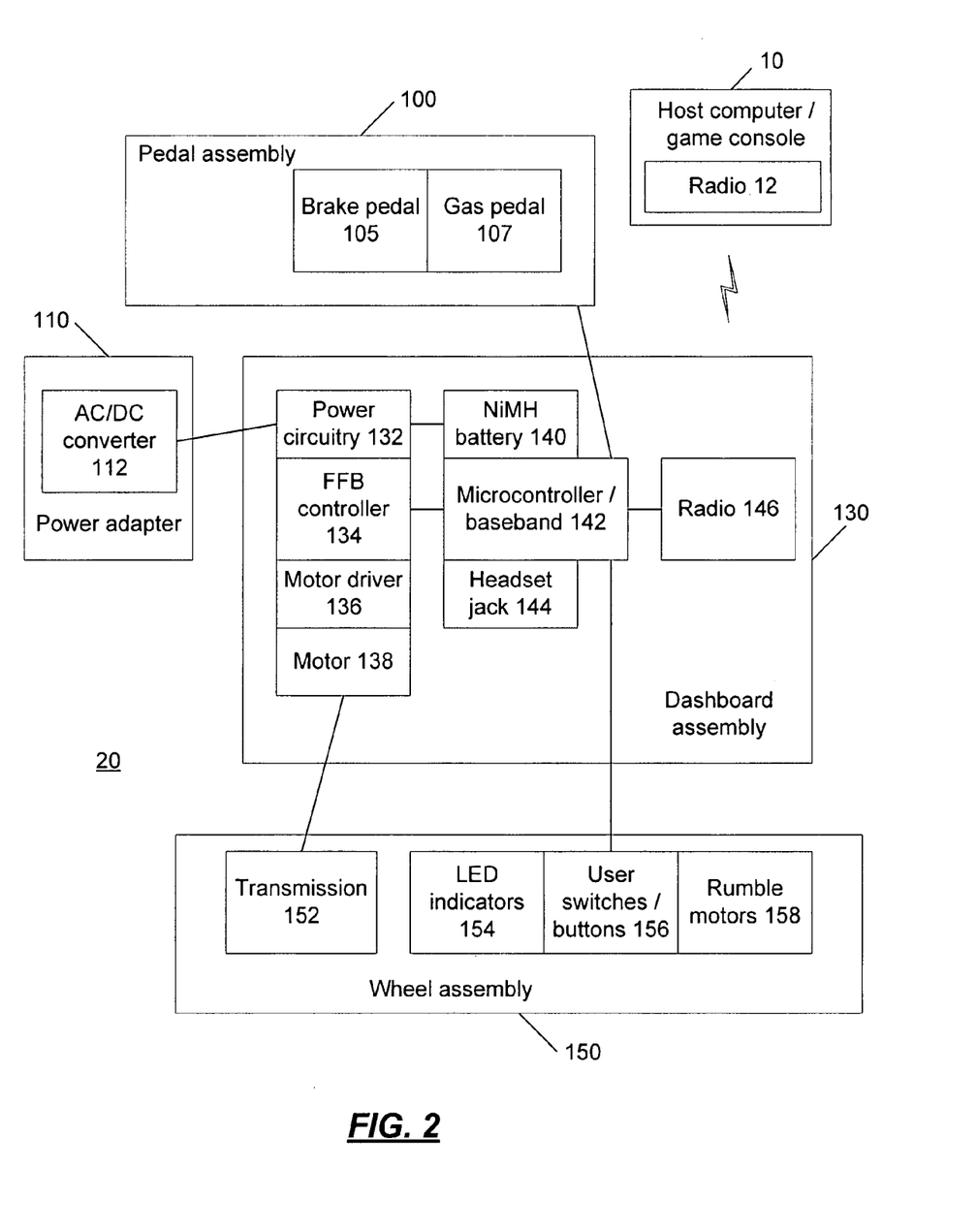
FIG. 2 is a block diagram of an example game peripheral.

A block diagram of an example game peripheral is shown in FIG. 2. Here, the game peripheral 20 is in the form of a steering wheel that comprises a pedal assembly 100, a power adapter 110, a dashboard assembly 130, and a wheel assembly 150.

An example pedal assembly 100 may comprise a brake pedal 105 and a gas pedal 107. An example power adapter 110 may comprise an AC/DC converter 112. An example wheel assembly 150 may comprise a transmission 152, indicators such as LED indicators 154, user switches or buttons 156, and rumble motors 158.

An example dashboard assembly 130 may comprise power circuitry 132, an FFB controller 134, a motor driver 136, and a motor 138. A microcontroller/baseband 142 may be provided, along with a battery 140 (e.g., an NiMH battery), a headset jack 144, and a game controller radio 146 (wireless module in the controller). The host computer/game console 10 may include a radio 12 (wireless module in console) for communication with the game peripheral, e.g., by way of the game controller radio 146. Alternately, a wired connection may be used. The controller 134 desirably maintains a close communication with the host computing device 10 through a device message and control protocol which is both periodic and on 'change-of-state' conditions.

The pedal assembly 100, the power adapter 110, and the wheel assembly 150 are desirably connected to the dashboard assembly 130. For example, the transmission 152 may be connected to the motor 138, with the user switches or buttons 156 and the brake and gas pedals 105, 107 may be connected to the microcontroller 142, and the AC/DC converter 112 may be connected to the power circuitry 132.

Certain components of the game peripheral 20 may be high-powered and they run off of AC power only, and other components may be able to run off of AC power or battery (DC) power. Desirably, the high-powered components are turned on when AC power is present, and otherwise are turned off. The components that can run off of AC power or battery power desirably run off of AC power when AC power is present, and otherwise run off of battery power.

High-powered components may include the power adapter 110 and a battery charger, the FFB controller 134, the FFB motor driver 136, and the FFB motor 138, for example. The microcontroller 142, radio 146, indicators 154, pedal assembly 100 (e.g., brake and gas pedals 105, 107), and user switches or buttons 156 desirably may run from battery power and are not affected when AC power is removed. These components may run from AC power when AC power is present, and then run from battery power when AC power is absent. Desirably, the switchover from AC power to battery power is immediate and will not be noticed by a user.

Some components, such as rumble motors 158 and indicators 154 for example, may alter their feature operation depending upon the amount of power that is available. For example, if AC power is available or if the battery power or charge level is above a certain threshold, then their features are fully operational. However, if the battery power or charge level is below a certain threshold and AC power is absent, then the features are altered or reduced to accommodate the lower power that is available.

The FFB controller 134 desirably supports wireless connection to a host computer for control but uses a power connection to an AC adapter 110 to support the force feedback experience. A user who wants a wireless experience but not the high-powered features of the input device (e.g., the FFB feature of the game peripheral), for example, can disable the AC adapter 110 on-the-fly (e.g., disconnecting or unplugging it) and continue playing without interruption or restarting the game or losing their continuity of play. A user can, conversely, add the adapter 110 on-the-fly and begin the high-powered (e.g., FFB) experience without losing their spot in the game.

The presence and absence of AC power at the game peripheral may be detected. The game console software is then notified regarding the status of presence of AC power and whether high-powered features are active. If AC power is present, then the high-powered features are activated, and if AC power is absent (e.g., the game peripheral is battery powered), then the high-powered features are deactivated.

More particularly, a mechanism, described further herein, operating in conjunction with a game peripheral desirably detects the presence or absence of AC power. The high-powered features may then be activated or deactivated accordingly, while not interrupting or slowing game play. Thus, the change of state from AC power to battery power, or from battery power to AC power, is detected and the high-powered features are then activated or deactivated accordingly. Also, preferably, the host computer/game console is notified about the power switch event and the current status, so that any software running may be appropriately modified or adjusted to take into account the power switch event and the current status.

To detect the presence/absence of AC power, a hardware circuit (the power circuitry 132) is used to detect the level from the battery versus the AC adapter power. The circuit also feeds constant power to the wireless baseband microcontroller 142 without interruptions when the power source is switched. The power circuitry 132 senses the presence of the adapter via hardware circuits and reports to the microcontroller 142 that the AC power is on. The microcontroller 142 messages this status to the host computer/gaming console 10 via status reports. Desirably, status reports are sent upon a change and when the device initializes a connection with the game console.

The status reports are sent using a messaging protocol that contains information about the AC power status, the adapter connection status, and status of the high-powered features. For example, if the status has changed such that AC power is no longer being provided to the game peripheral, the game console reports the status to the game application and modifies the console's and application's behavior so that no high-powered feature commands (i.e., to exclude FFB commands) are sent to the game peripheral.

According to an embodiment, the enabling/disabling of the high-powered features is determined in the game console and the game application interface. Status reports are sent upstream to the game console from the game peripheral, and the high-powered feature driver in the game console takes actions to update the game application as well as set modes.

Figure 3:
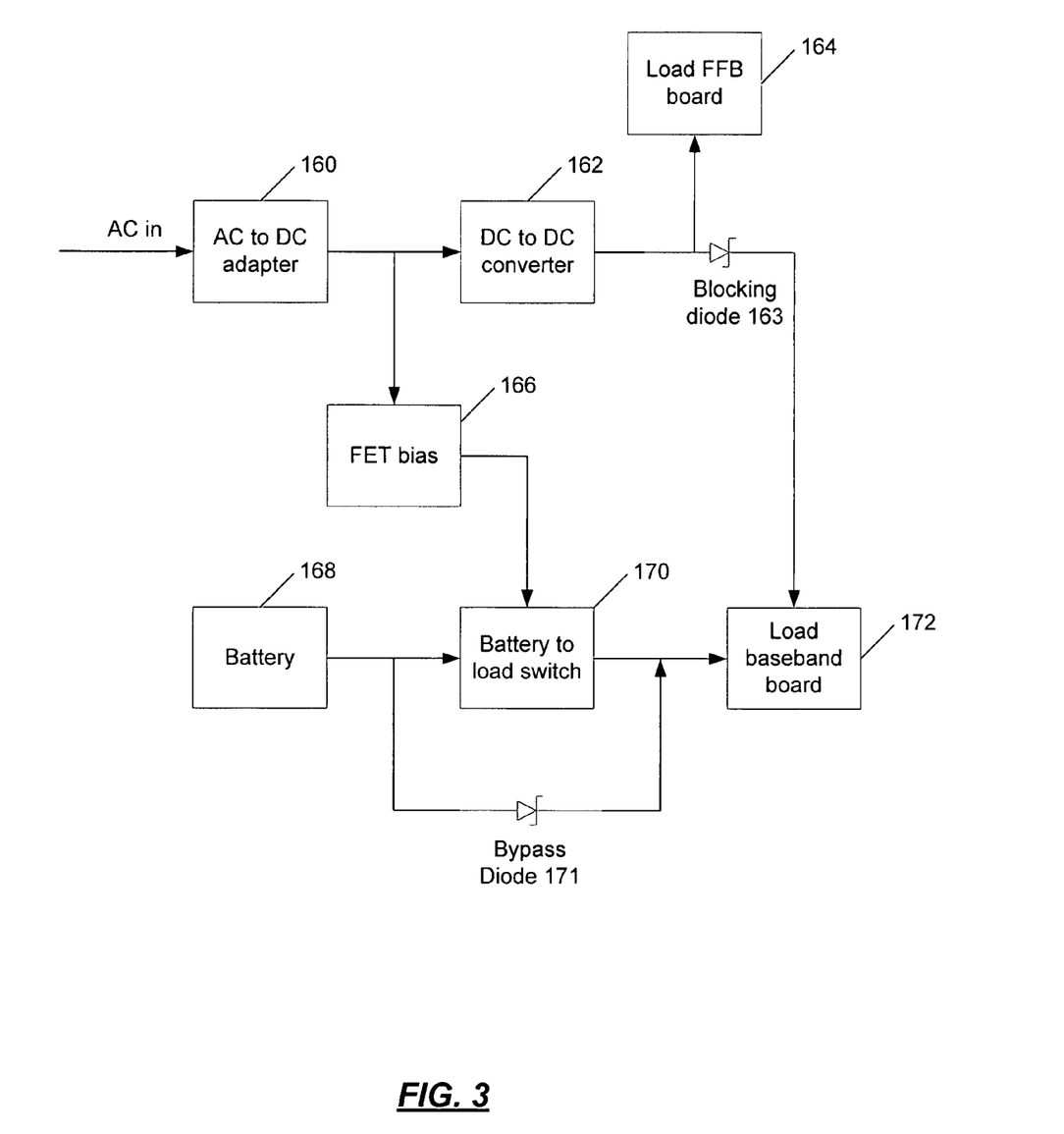
FIG. 3 is a block diagram of an example power circuitry block.

FIG. 3 is a block diagram of an example power circuitry block, such as the power circuitry 132. When AC power is present and has reached its normal working state, the AC to DC adapter 160 (e.g., power adapter 110 in FIG. 2) is running and outputs 24V to the circuit, for example. The DC to DC converter 162 receives the 24V as input, and outputs 3.3V used by the control circuitry. The FET bias line 166 carries a voltage representation of the 24V presence within the electrical range required to keep the battery to load switch 170 off.

When the AC power is removed, the FET bias line 166 decays to circuit ground level which causes the battery to load switch to turn on. The battery 168 (e.g., battery 140 in FIG. 2) feeds the baseband board load 172 (e.g., microcontroller/baseband 142 in FIG. 2) through the blocking diode 163. The blocking diode 163 avoids the battery 168 output to feedback into the DC to DC converter 162 output and the force feedback board circuitry 164. The bypass diode 171 does not have an active presence in this context, since the resistance of the battery to load switch 170 is very low. No energy from the battery 168 is wasted on this diode. In this state, the force feedback board circuitry 164 is not active and does not require power from the battery.

If the AC power is then reconnected, the output of the AC to DC adapter 160 will ramp up over a short period of time to its nominal output of 24V. The FET bias line 166 will rise in voltage and cause the battery to load switch 170 to turn off. The DC to DC converter 162 will automatically start in the presence of enough input DC voltage, putting out its nominal voltage to feed all the circuitry of both the boards. The bypass diode 171 will conduct as long as the voltage on the battery 168 is a fraction of a volt above the load voltage.

In the process when the battery to load switch 170 is being turned off and the DC to DC converter 162 is starting, the bypass diode 171 keeps the load fed from the battery 168 until the DC to DC converter 162 comes up close to its full output. When the DC to DC converter 162 is running and stable, the voltage in the load is higher than the voltage the battery can reach even when fully charged. The bypass diode 171 now blocks the battery 168 from drawing current from the load circuits.

Desirably, the controller 142 is aware of the AC power status by detecting that the DC circuit voltage is present when the AC power is connected. The FFB controller 134 along with its corresponding circuitry do not use battery power when AC power is present. The system adapts itself to battery operation as part of the power switching alternative by reducing the power consumption to a minimum, and that the FFB components are activated when AC power is present.

According to an embodiment, because the FFB controller 134 is not powered when AC power is not present, it does not provide any information to the controller 142 when AC power is not present. The controller 142 reads the logic state of the AC in line and determines if AC power is present by interpreting the logic level as high or low. A pull up resistor may be connected to the AC line to keeps the AC in line high when AC power is present. The controller 142 acts according to this finding. If there is AC power, it ceases to report battery status to the host and passes FFB commands to the FFB processor. If the AC in line is low, then the controller 142 acts as being battery driven and passes battery information to the host, and does not attempt to communicate with the FFB controller 134.

An example protocol between the controllers 134 and 142 includes a retry sequence to avoid bad information being exchanged during power transitions. The FFB controller 134 does not alter the status of the AC line by itself.

According to an embodiment, a DC 3.3V supply has a bleeding resistor across the load such that it creates a voltage divider with any reverse leakage present on the 3.3V (if any) when AC power is removed and the local DC to DC converter is not operating.

Desirably, the FFB and baseband areas of the circuit are isolated such that the FFB circuit is effectively powered off once AC power is not present. Some very low level leakage may exist under temperature conditions or component fringe behavior, that are small enough to not even count for battery usage. Nevertheless, if any leakage flows back into the 3.3V line, the presence of the bleeding resistor (e.g., 1K) keeps the 3.3V line grounded and any information drawn from that line is representative of the system power.

Desirably, in the absence of AC power, the 3.3V is at the ground level, thus avoiding the possibility of the AC in line voltage to be high enough to make the controller 142 assume AC power is present.

The modes of auto-switching fall into two areas: battery-to-adapter and adapter-to-battery. Additionally, power up scenarios through a battery installation or adapter connection is preferably covered by the same management and status mechanisms.

Figure 4:
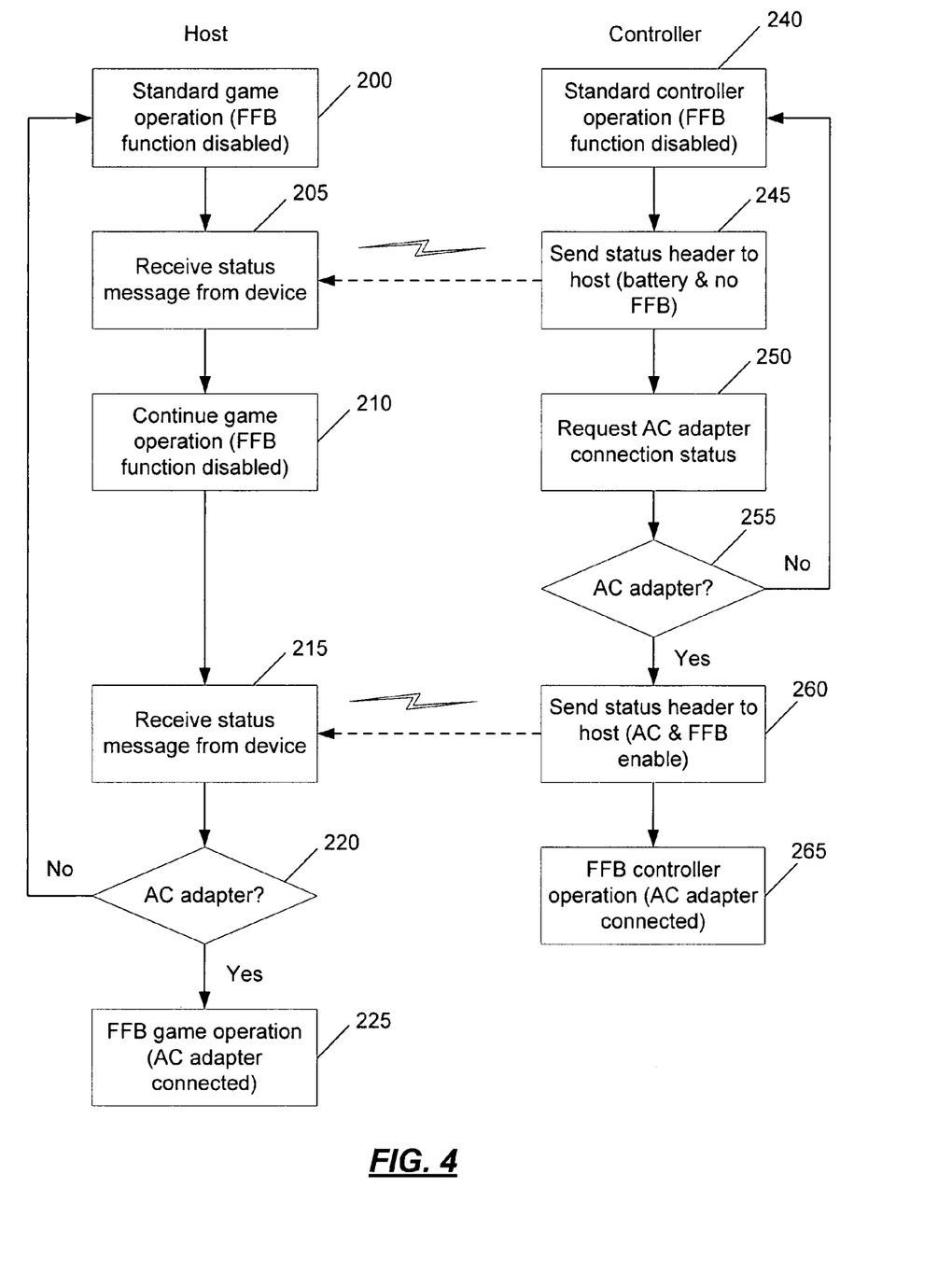
FIG. 4 is a flow diagram of an example method involving a battery operation mode.

FIG. 4 is a flow chart that shows a game controller during its battery operation mode. The device monitors the condition of the power connection in order to notify the host (e.g., game console) of a change-of-state and the desirability to support the high-powered (e.g., adapter powered) functional mode based on the power configuration. The power management and control circuits switch seamlessly between the battery and AC adapter, and this change of status is sent to the host without any interruption of the gaming experience.

On the host side, in battery power mode, at step 200, the game or application is operating with the high-powered features disabled. The game peripheral, at step 240, also has its high-powered features disabled. The peripheral sends a status report to the host at step 245, reporting that the peripheral is battery powered and not using its high-powered features. At step 205, the host receives the status message from the peripheral and continues game operation with the high-powered features disabled, at step 210.

The game peripheral, at step 250, requests the AC adapter connection status, and the status is determined at step 255. If the AC adapter is still not connected to provide AC power, then the operation continues with the high-powered features disabled, at step 210. If, however, AC power is now being provided, as determined at step 255, then a status report is generated and sent to the host, at step 260. The status report indicates that AC power is now being provided, and that the high-powered features can be activated. At step 265, the high-powered features on the game peripheral are activated.

At step 215, the host receives the status report, and determines from the status report at step 220 whether AC power is now being provided to the game peripheral. If the AC adapter is still not connected to provide AC power, then the operation continues with the high-powered features disabled, at step 200. If, however, AC power is now being provided, as determined from the status report at step 220, then the application is run with the high-powered features activated, at step 225.

Figure 5:
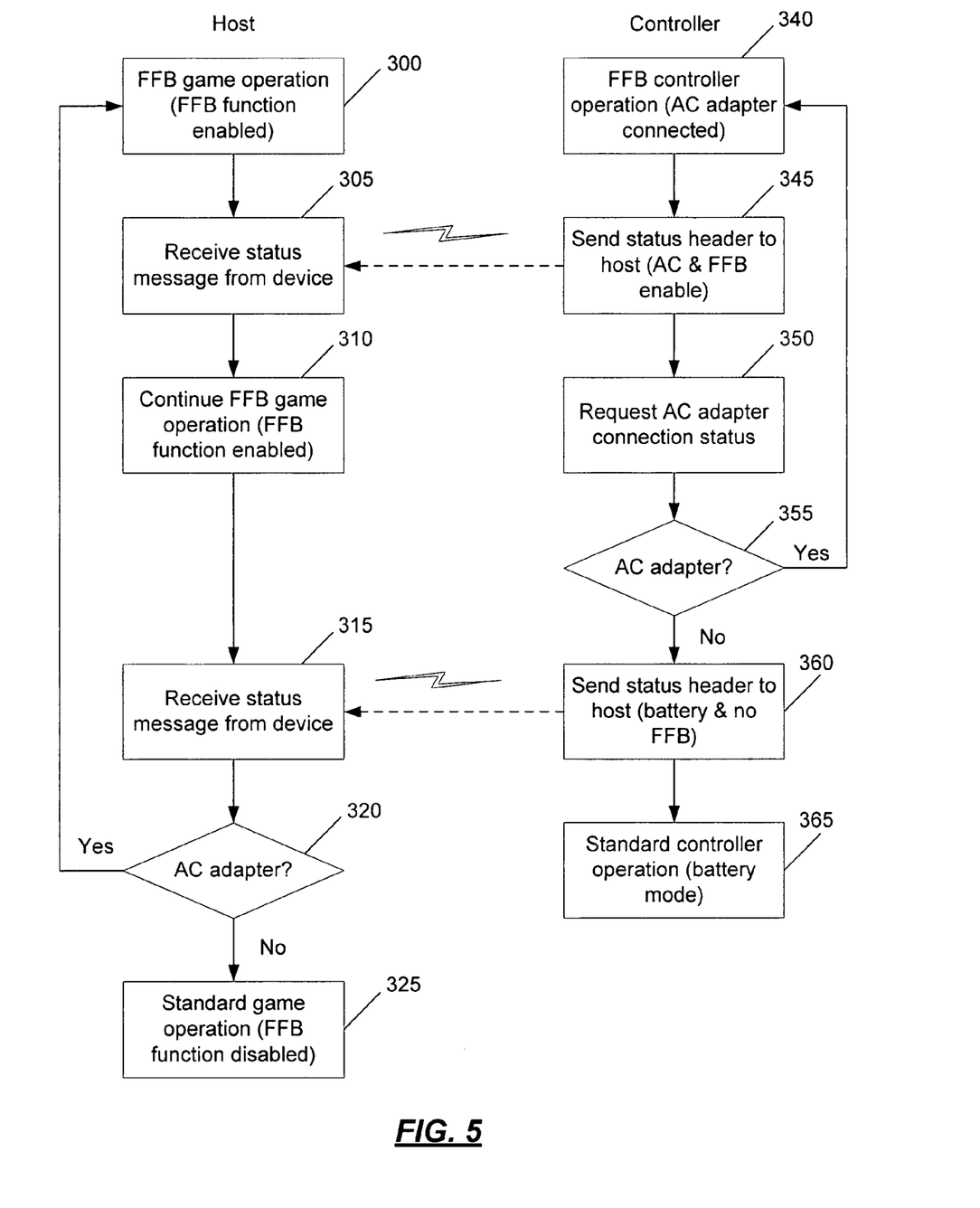
FIG. 5 is a flow diagram of an example method involving an AC adapter operation mode.

FIG. 5 is a flow chart that shows a game controller during its AC adapter operation mode. The game and controller are operating in AC adapter powered mode and high-powered (e.g., FFB) functions are fully enabled. The device monitors the condition of the power connection in order to notify the host of a change-of-state and the desirability to support the battery powered functional mode based on the power configuration. The power management and control circuits switch seamlessly between AC adapter and battery, and this change of status is sent to the host without interruption of the gaming experience.

On the host side, in AC power mode, at step 300, the application is operating with the high-powered features enabled. The game peripheral, at step 340, also has its high-powered features enabled. The peripheral sends a status report to the host at step 345, reporting that the peripheral is AC powered and is using its high-powered features. At step 305, the host receives the status message from the peripheral and continues game operation with the high-powered features enabled, at step 310.

The game peripheral, at step 350, requests the AC adapter connection status, and the status is determined at step 355. If the AC adapter is still connected to provide AC power, then the operation continues with the high-powered features enabled, at step 310. If, however, AC power is no longer being provided, as determined at step 355, then a status report is generated and sent to the host, at step 360. The status report indicates that AC power is no longer being provided, and that the high-powered features are to be disabled. At step 365, the high-powered features on the game peripheral are disabled.

At step 315, the host receives the status report, and determines from the status report at step 320 whether AC power is still being provided to the game peripheral. If the AC adapter is still connected to provide AC power, then the operation continues with the high-powered features enabled, at step 300. If, however, AC power is not being provided, as determined from the status report at step 320, then the application is run with the high-powered features disabled, at step 325.

Although the examples described herein may be directed to game peripherals, it is contemplated that any input device may be used. Similarly, while the examples may be directed to games, any software application is contemplated.

Figure 6:
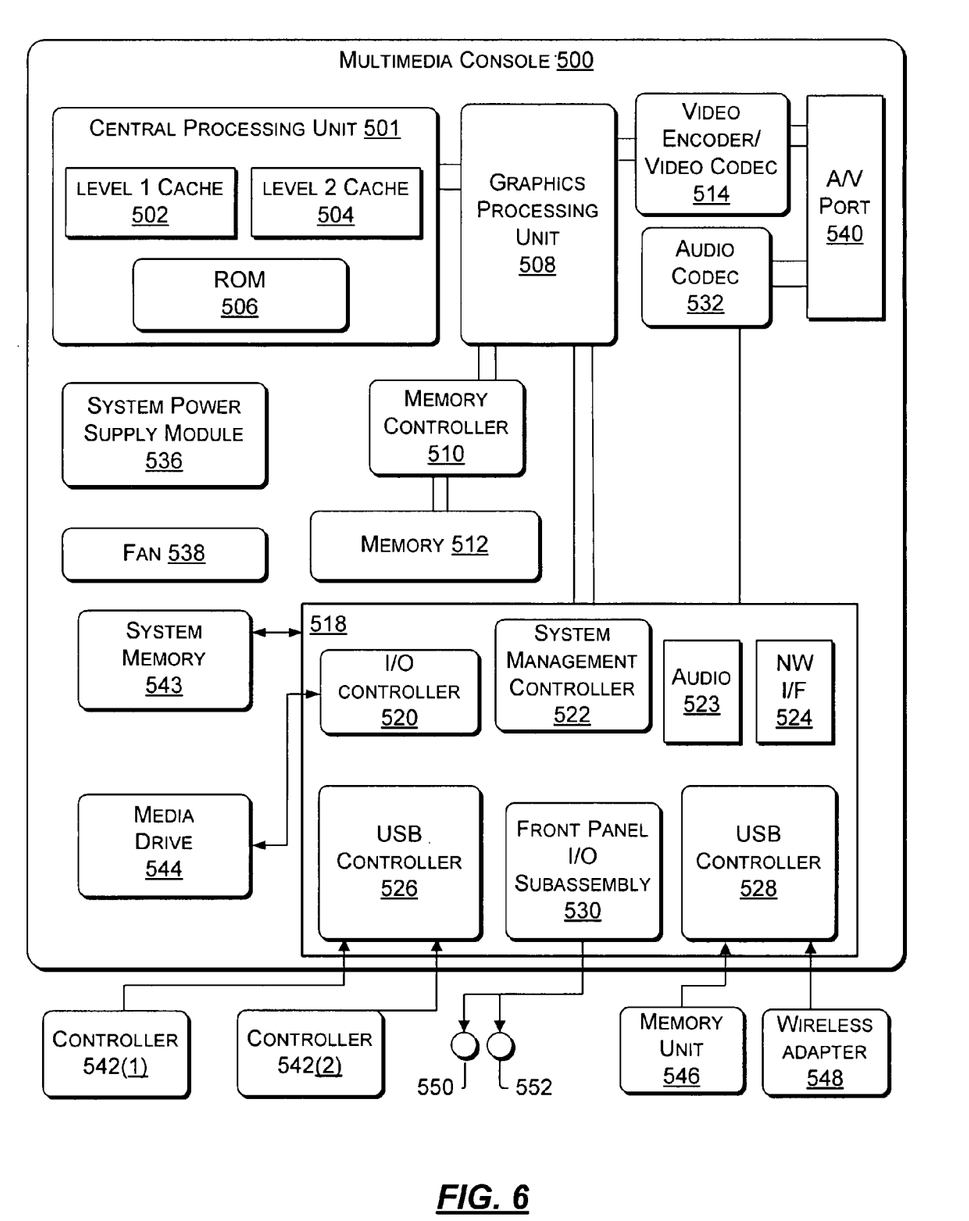
FIG. 6 is a block diagram illustrating an exemplary game console.

FIG. 6 illustrates the functional components of a multimedia/gaming console 500 that may be used with examples described herein. The multimedia console 500 has a central processing unit (CPU) 501 having a level 1 cache 502, a level 2 cache 504, and a flash ROM (Read Only Memory) 506. The level 1 cache 502 and a level 2 cache 504 temporarily store data and hence reduce the number of memory access cycles, thereby improving processing speed and throughput. The CPU 501 may be provided having more than one core, and thus, additional level 1 and level 2 caches 502 and 504. The flash ROM 506 may store executable code that is loaded during an initial phase of a boot process when the multimedia console 500 is powered ON.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display. A memory controller 510 is connected to the GPU 508 to facilitate processor access to various types of memory 512, such as, but not limited to, a RAM (Random Access Memory).

The multimedia console 500 includes an I/O controller 520, a system management controller 522, an audio processing unit 523, a network interface controller 524, a first USB host controller 526, a second USB controller 528 and a front panel I/O subassembly 530 that are preferably implemented on a module 518. The USB controllers 526 and 528 serve as hosts for peripheral controllers 542(1)-542(2), a wireless adapter 548, and an external memory device 546 (e.g., flash memory, external CD/DVD ROM drive, removable media, etc.). The network interface 524 and/or wireless adapter 548 provide access to a network (e.g., the Internet, home network, etc.) and may be any of a wide variety of various wired or wireless adapter components including an Ethernet card, a modem, a Bluetooth module, a cable modem, and the like.

System memory 543 is provided to store application data that is loaded during the boot process. A media drive 544 is provided and may comprise a DVD/CD drive, hard drive, or other removable media drive, etc. The media drive 544 may be internal or external to the multimedia console 500. Application data may be accessed via the media drive 544 for execution, playback, etc. by the multimedia console 500. The media drive 544 is connected to the I/O controller 520 via a bus, such as a Serial ATA bus or other high speed connection (e.g., IEEE 1394).

The system management controller 522 provides a variety of service functions related to assuring availability of the multimedia console 500. The audio processing unit 523 and an audio codec 532 form a corresponding audio processing pipeline with high fidelity and stereo processing. Audio data is carried between the audio processing unit 523 and the audio codec 532 via a communication link. The audio processing pipeline outputs data to the A/V port 540 for reproduction by an external audio player or device having audio capabilities.

The front panel I/O subassembly 530 supports the functionality of the power button 550 and the eject button 552, as well as any LEDs (light emitting diodes) or other indicators exposed on the outer surface of the multimedia console 500. A system power supply module 536 provides power to the components of the multimedia console 500. A fan 538 cools the circuitry within the multimedia console 500.

The CPU 501, GPU 508, memory controller 510, and various other components within the multimedia console 500 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 500 is powered ON, application data may be loaded from the system memory 543 into memory 512 and/or caches 502, 504 and executed on the CPU 501. The application may present a graphical user interface that provides a consistent user experience when navigating to different media types available on the multimedia console 500. In operation, applications and/or other media contained within the media drive 544 may be launched or played from the media drive 544 to provide additional functionalities to the multimedia console 500.

The multimedia console 500 may be operated as a standalone system by simply connecting the system to a television or other display. In this standalone mode, the multimedia console 500 allows one or more users to interact with the system, watch movies, or listen to music. However, with the integration of broadband connectivity made available through the network interface 524 or the wireless adapter 548, the multimedia console 500 may further be operated as a participant in a larger network community.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An input device adapted to couple to a host device, the input device comprising:
   circuitry for detecting a loss of received power from an alternating current (AC) source and switching thereon, to a direct current (DC) source comprising a battery;
   a first haptic component that is configured to provide a first operational feature when power is received from the AC source and to provide an altered version of the first operational feature in order to accommodate lower power when power is received solely from the battery; and
   a low power consumption second component that is operated when power is received from at least one of the AC source or the battery, wherein the low power consumption second component consumes less power than the first haptic component, wherein the first haptic component comprises a motor that operates at a first level when power is received from the AC source and operates at a reduced level when power is received solely from the battery.

2. The input device of claim 1, wherein the first haptic component provides a force feedback sensation in response to a signal from the host device.

3. The input device of claim 1, wherein the low power consumption second component is one of a microcontroller, a radio, indicators, a pedal assembly, a user switch, or a user button.

4. The input device of claim 1, wherein all features of the low power consumption second component are fully operational when power is received from the AC source and a reduced set of features is operational when power is received from the battery.

5. The input device of claim 1, further comprising an output device for transmitting a power status from the input device to the host device.

6. The input device of claim 5, wherein the power status is comprised within a messaging protocol that contains information about the status of the power received from the AC source, an adapter connection status, and status of the first haptic component.

7. The input device of claim 1, wherein the received power can switch from the AC source to the battery, or vice versa, in realtime.

8. The input device of claim 1, wherein at least one feature of the low power consumption second component is operational at a first level when power is received from the AC source, and is operational at a reduced level when power is received from the battery.

9. A method of operating an input device having a first component and a second component, the input device adapted to couple to a host device, the method comprising:
   monitoring power provided by an alternating current (AC) source to the input device for detecting a loss of AC power condition;
   activating the first component and the second component when the received power is from the AC source, wherein the first component is a high power consumption component and the second component is a low power consumption that consumes less power than the high power consumption component; and upon detecting the loss of AC power condition, transmitting a status report from the input device to the host device, whereupon the host device stops sending at least one command that is directed at operating a feature of the high power consumption component.

10. The method of claim 9, wherein the high power consumption component includes a haptic component.

11. The method of claim 9, further comprising monitoring a source connection status.

12. The method of claim 11, wherein monitoring the source connection status comprises monitoring a status of an AC adapter.

13. The method of claim 11, further comprising generating a status message containing information based on the monitoring, and transmitting the status message to the host device.

14. The method of claim 13, wherein the status message comprises information pertaining to a change of source of the received power.

15. A memory having at least one executable instruction stored thereon, the at least one executable instruction, when executed by a processor, perform operations comprising:

monitoring power provided by an alternating current (AC) source to an input device for detecting a loss of AC power condition;

activating a first haptic component and a second component when the received power is from the AC source, wherein the first haptic component is a high power consumption component and the second component is a low power consumption component that consumes less power than the high power consumption component; and upon detecting the loss of AC power condition, transmitting a status report from the input device to a host device, whereupon the host device stops sending at least one command that is directed at operating a feature of the high power consumption component, wherein the first haptic component comprises a motor that operates at a first level when power is received from the AC source and operates at a reduced level when power is received solely from a battery.

16. The memory of claim 15, wherein the high power consumption component includes a haptic component.

17. The memory of claim 15, the operations further comprising monitoring a source connection status.

18. The memory of claim 17, wherein monitoring the source connection status comprises monitoring a status of an AC adapter.

19. The memory of claim 17, the operations further comprising generating a status message containing information based on the monitoring, and transmitting the status message to the host device.

20. The memory of claim 19, wherein the status message comprises information pertaining to a change of source of the received power.

* * * * *